INVENTOR
A. J. HARENDZA-HARINXMA

3,275,915
BETA TANTALUM THIN-FILM CAPACITORS
Alfred J. Harendza-Harinxma, Trenton, N.J., assignor to Western Electric Company, Incorporated, New York, N.Y., a corporation of New York
Filed Aug. 17, 1965, Ser. No. 480,383
5 Claims. (Cl. 317—258)

This invention relates to a thin-film capacitor and more particularly to a thin-film capacitor having a dielectric of oxidized beta tantalum.

Reference is herewith made to the copending application Serial No. 448,553 of Altman et al. filed April 5, 1965, to incorporate the application by reference thereto. This application is assigned to Western Electric Company, Inc., and to Bell Telephone Laboratories, Inc. Beta tantalum, a newly discovered material disclosed and claimed in the above-identified application, has the same gross composition as body-centered cubic tantalum (normal tantalum), but which has a different crystalline structure and properties.

In the communications industry, thin-film electrical components have permitted a great reduction in the size of complex electronic systems and have increased the reliability of such systems. However, difficulty has been encountered in manufacturing a thin-film capacitor on a high-yield mass production basis which possesses good leakage current characteristics and capacitor stability both initially and on extended life test. Such a thin-film capacitor is essential if a full utilization of the thin-film technology is to be possible.

Research directed in an effort to discover a thin-film capacitor which possesses good leakage current characteristics and capacitor stability both initially and on extended life test and which can be manufactured on a high-yield basis resulted in the unexpected discovery that a thin-film capacitor having a dielectric of oxidized beta tantalum fulfills these requirements.

It is therefore an object of this invention to provide an improved thin-film capacitor.

It is an additional object of this invention to provide a thin-film capacitor which possesses good leakage current characteristics and capacitor stability both initially and on extended life test.

It is another object of this invention to provide a thin-film capacitor possessing good leakage current characteristics and capacitor stability both initially and on extended life test which can be manufactured on a high-yield mass production basis.

With these and other objects in view, this invention contemplates a thin-film capacitor having a thin-film electrode supported on a nonconductive substrate wherein a selected area of the electrode is covered by a dielectric film of oxidized beta tantalum and a counter electrode overlies the dielectric film.

The invention may be more readily understood by reference to the description which follows when taken in conjunction with the drawings in which.

Beta tantalum is most readily distinguished from normal tantalum by its crystal structure which may be observed, for example, by X-ray diffraction techniques.

An X-ray diffraction pattern for a given material is represented in conventional notation by a listing of $d$-spacings for the material in decreasing order of magnitude usually expressed in angstrom units. Each $d$-spacing of a particular material is the distance in angstrom units between individual crystal planes in a given set of parallel crystal planes.

As is well known, the term "$d$-spacing" derives from Bragg's law, $\lambda = 2d \sin \theta$, where $\lambda$ is the wavelength of the radiation reflected by parallel crystal planes, $\theta$ is the angle of incidence (or reflection) of the radiation, and $d$ is the distance between the parallel crystal planes.

As each crystalline material has a unique X-ray diffraction pattern, comparison of the X-ray diffraction pattern of an unknown material with the X-ray diffraction patterns for known materials, for example, as listed in published powder diffraction files, permits qualitative identification of the unknown material. Since beta tantalum possesses a unique X-ray diffraction pattern, use of this technique permits positive identification of beta tantalum. X-Ray Metallography written by A. Taylor and published in 1961 by John Wiley and Sons, Inc., pp. 154–158 and 160–161, discusses X-ray diffraction patterns and their usefulness as a unique indicia for identifying materials.

Table I lists all of the $d$-spacings for beta tantalum which have been observed.

TABLE I

| $d$, A. | $d$, A. | $d$, A. |
|---|---|---|
| 5.38 | 2.15 | 1.37 |
| 4.75 | 2.06 | 1.332 |
| 2.80 | 1.96 | 1.29 |
| 2.67 | 1.77 | 1.240 |
| 2.62 | 1.59 | 1.210 |
| 2.49 | 1.56 | 1.172 |
| 2.36 | 1.53 | 1.10 |
| 2.32 | 1.46 | 1.03 |
| 2.25 | 1.442 | 1.01 |
| 2.21 | 1.405 | |

The $d$-spacings found in Table I are a compilation of $d$-spacings observed by different techniques. All of the $d$-spacings listed are observable by making direct measurements of films which have been exposed to X-rays diffracted from a sample of beta tantalum. Different techniques can be used in exposing the films from which the direct measurements are made. For example, the sample can be held stationary while the films are exposed or the sample can be oscillated. A large number of the $d$-spacings listed are obtainable by diffractometer techniques. Studies of beta tantalum by electron diffraction also confirm many of the $d$-spacings recorded in Table I.

In Table II $d$-spacings are listed which are considered to be particularly accurate. These particular $d$-spacings are confirmed by two or more different techniques.

TABLE II

| $d$, A. | $d$, A. | $d$, A. |
|---|---|---|
| 5.38 | 2.32 | 1.405 |
| 4.75 | 2.15 | 1.332 |
| 2.67 | 2.06 | 1.240 |
| 2.49 | 1.77 | 1.210 |
| 2.36 | 1.442 | 1.172 |

Figure 1:
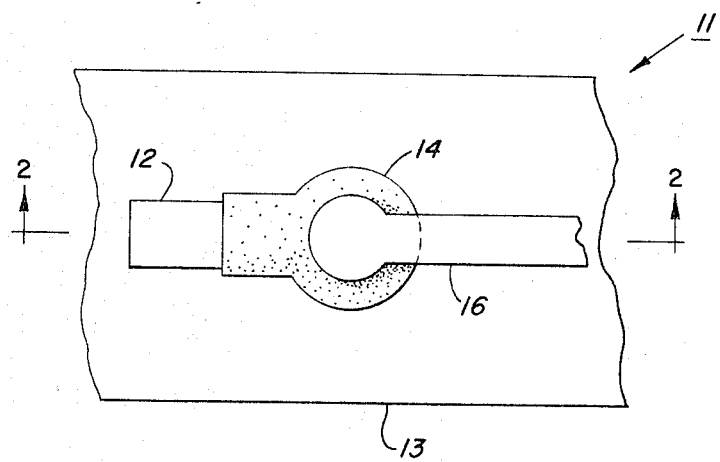
FIG. 1 is a plan view of a thin-film capacitor according to this invention.
Figure 2:
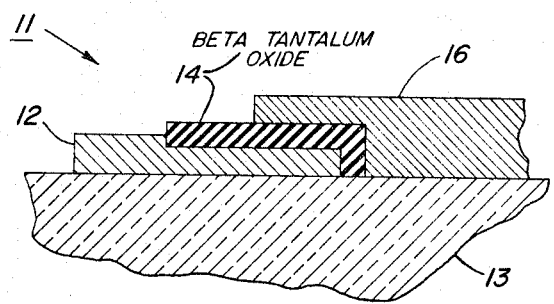
FIG. 2 is a sectional view taken along lines 2—2 of FIG. 1.

FIGS. 1 and 2 illustrate a thin-film capacitor generally indicated by the numeral 11. Capacitor 11 includes an electrode 12, preferably a thin-film of beta tantalum, upon a nonconductive substrate 13 of glass, ceramic, or other suitable substrate material. A dielectric film 14 of oxidized beta tantalum covers a selected area of electrode 12 and a counter electrode, preferably of gold, overlies the dielectric film 14. The dielectric film 14 separates the electrodes 12 and 16 to form the thin-film capacitor 11.

For convenience, the oxide film formed by oxidizing beta tantalum will be referred to hereinafter as "beta tantalum oxide." In addition, a beta tantalum thin-film capacitor as defined herein is a thin-film capacitor having a dielectric film 14 of beta tantalum oxide. A normal tantalum capacitor is a capacitor having a dielectric film of oxidized normal tantalum.

A suitable technique for manufacturing a beta tantalum thin-film capacitor includes the deposition of a continuous film of beta tantalum on a nonconductive substrate. The above-identified Altman et al. application discloses a suitable process for depositing a continuous film of beta tantalum on a substrate by cathodic sputtering in an in-line vacuum machine of the type disclosed in the copending Charschan et al. application, Serial No. 314,412, filed October 7, 1963, and assigned to Western Electric Company, Inc. This step produces a substrate 13 having a continuous film of beta tantalum thereon.

The beta tantalum films deposited in the in-line vacuum machine disclosed in the above-mentioned Charschan et al. application are highly suitable for the manufacture of beta tantalum thin-film capacitors. However, should the films contain small amounts of impurities such as copper or iron, it may not be possible to properly anodize the films. In such cases, the impurities may be removed by boiling in a suitable acid such as concentrated hydrochloric or nitric acid.

Beta tantalum and normal tantalum thin-film capacitors may be fabricated in an identical, well-known manner from substrates having a continuous film of the desired material thereon.

Proceeding with a substrate 13 having a thin film of beta tantalum thereon, it is first necessary to give shape to electrode 12. The copending Altman application, Serial No. 470,981, filed July 12, 1965, and assigned to Western Electric Company, Inc. discloses a photoetching technique which is highly suitable for shaping the electrode 12.

Subsequent to shaping the electrode 12, the dielectric film 14 is readily formed by anodizing a selected area of the electrode. A suitable anodization process for converting either beta tantalum or normal tantalum to an oxide is disclosed in U.S. Patent 3,148,129 assigned to Bell Telephone Laboratories, Inc. By masking the electrode 12, anodization of the electrode is restricted to a preselected area.

Counter electrode 16 may be deposited by vacuum evaporation of a conductive material such as gold onto the dielectric film through a suitable mask. The dielectric film 14 separates and spaces the counter electrode 16 from the electrode 12 to form the capacitor 11.

A useful criterion in evaluating capacitors is their leakage current characteristics. For example, a 0.03 microfarad capacitor may be acceptable for use in communications system if it has a leakage current of not less than $10^{-8}$ amperes at a potential of 75 volts. An additional criterion is that the capacitors have good capacitor stability, i.e., the capacitance should change very little due to point-fault burnout at leakage locations. Acceptable capacitors may be required to have a capacitance change of less than 6% due to such leakage faults.

Tests conducted on a plurality of beta tantalum and normal tantalum capacitors unexpectedly resulted in the discovery that the beta tantalum capacitors consistently exhibited superior leakage current characteristics and capacitor stability. These tests were conducted on capacitors having the same physical dimensions and fabricated by the same processes. The particular beta tantalum capacitors tested had an average capacitance of 0.02975 microfarad and the particular normal tantalum capacitors tested had an average capacitance of 0.03155.

As the capacitors tested had a capacitance of substantially 0.03 microfarad, leakage current characteristics and capacitor stability were evaluated in terms of the criteria set forth above. Therefore, an acceptable capacitor was defined as a capacitor having a leakage current of less than $10^{-8}$ amperes and a capacitance change of less than 6% due to point-fault burnout at leakage locations. Yield was then calculated as the percentage of acceptable capacitors in a particular group, i.e., if 6 capacitors out of 30 tested (20%) had a leakage current of less than $10^{-8}$ amperes and a capacitance change of less than 6% due to point-fault burnout, then the yield was considered to be 20%.

Initial leakage current tests conducted on 246 beta tantalum capacitors at 75 volts disclosed that over 93% of the capacitors had a leak current of less than $10^{-8}$ amperes. In contrast, less than 49% of 251 normal tantalum capacitors had an initial leakage current of less than $10^{-8}$ amperes at 75 volts. Therefore, the initial yield on the beta tantalum capacitors was 93% whereas the initial yield on the normal tantalum capacitors was only 49%.

Life tests at 50 volts and a temperature of 85° C. were conducted on 107 acceptable beta tantalum capacitors. After 125 hours on life tests over 96% of the beta tantalum capacitors had a leakage current of less than $10^{-8}$ amperes and a capacitance change of less than 6%. After 2700 hours on life tests over 92% had a leakage current of less than $10^{-8}$ amperes and a capacitance change of less than 6%. In contrast, less than 30% of 42 acceptable normal tantalum capacitors placed on life tests at 50 volts and 85° C. for 125 hours had a leakage current of less than $10^{-8}$ amperes and a capacitance change of less than 6%. Therefore, the beta tantalum capacitors had a yield after 125 hours on life tests of 96% and after 2700 hours of 92% whereas the normal tantalum capacitors had a yield of only 30% after 125 hours.

Beta tantalum thin-film capacitors have been found to consistently exhibit better leakage current characteristics and capacitor stability both initially and on extended life tests than normal tantalum thin-film capacitors. The high yields achieved with beta tantalum capacitors, i.e., the high percentage of beta tantalum capacitors having a leakage current of less than $10^{-8}$ amperes and a capacitance change of less than 6% both initially and on extended life tests, makes the mass production of thin-film capacitors highly practical.

It is not completely understood why these higher yields are achieved with beta tantalum capacitors. It is thought that beta tantalum oxide is a more homogeneous and/or amorphous oxide than the oxide of normal tantalum. In other words, beta tantalum oxide apparently has fewer faults than the oxide of normal tantalum. Such faults, for example, could be voids or areas of crystalline tantalum oxide which form a leakge current path in the dielectric film. The crystalline structure of beta tantalum is thought to facilitate the growth of a more homogeneous and/or amorphous film.

Although the illustrated thin-film capcitor has an electrode 12 of beta tantalum, it is to be understood that other conductive materials may be used. For example, normal tantalum, tantalum nitride, niobium or aluminum may be used. When another conductive material is used as an electrode, a thin film of a beta tantalum is deposited over the electrode and subsequently oxidized to form the dielectric film of beta tantalum oxide. In addition, any process suitable for the fabrication of normal tantalum thin-film capacitors may be used to fabricate beta tantalum thin-film capacitors.

What is claimed is:
1. A thin-film capacitor comprising:
   a thin-film electrode supported on a nonconductive substrate,
   a dielectric film of beta tantalum oxide covering a selected area of the electrode, and
   a counter electrode opposing the electrode and separated therefrom by the dielectric film.
2. A thin-film capacitor comprising:
   a nonconductive substrate, a conductive thin-film material supported on said substrate and shaped to form an electrode,
a dielectric film of beta tantalum oxide overlying a preselected area of said electrode, and
a conductive material spaced from the electrode by the dielectric film to form a counter electrode.

3. A thin-film capacitor comprising:
an electrode of beta tantalum supported on a nonconductive substrate,
a dielectric film of beta tantalum oxide covering a selected area of the electrode, and
a counter electrode opposing the electrode and separated therefrom by the dielectric film.

4. A thin-film capacitor comprising:
a nonconductive substrate,
a thin film of beta tantalum supported on the substrate and shaped to form an electrode,
a dielectric film of beta tantalum oxide covering a selected area of the electrode, and
a counter electrode opposing the electrode and separated from the electrode by the dielectric film.

5. A thin-film capacitor comprising:
a nonconductive substrate,
a thin film of beta tantalum supported on the substrate and shaped to form an electrode,
a dielectric film of beta tantalum oxide covering a selected area of the electrode, and
a counter electrode of gold opposing the electrode and separated from the electrode by the dielectric film.

References Cited by the Examiner

Berry, R. W., and Sloan, D. J.: Tantalum Printed Capacitors, in Proceeding of the IRE, June 1959, pp. 1070–1075.

LEWIS H. MYERS, *Primary Examiner.*

LARAMIE E. ASKIN, *Examiner.*

E. GOLDBERG, *Assistant Examiner.*